US011733600B2

(12) United States Patent
Takamine et al.

(10) Patent No.: US 11,733,600 B2
(45) Date of Patent: Aug. 22, 2023

(54) ILLUMINATION DEVICE WITH PROJECTOR AND ILLUMINATION DEVICE

(71) Applicant: SEIKO EPSON CORPORATION, Tokyo (JP)

(72) Inventors: Yusaku Takamine, Azumino (JP); Daisuke Yamazaki, Nagano (JP); Kosuke Tabayashi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 83 days.

(21) Appl. No.: 17/471,852

(22) Filed: Sep. 10, 2021

(65) Prior Publication Data

US 2022/0075251 A1 Mar. 10, 2022

(30) Foreign Application Priority Data

Sep. 10, 2020 (JP) ................................. 2020-152012

(51) Int. Cl.
| | |
|---|---|
| *G03B 29/00* | (2021.01) |
| *G03B 21/14* | (2006.01) |
| *F21V 33/00* | (2006.01) |
| *F21V 21/104* | (2006.01) |
| *G03B 21/16* | (2006.01) |
| *F21V 29/80* | (2015.01) |
| *F21V 9/00* | (2018.01) |

(52) U.S. Cl.
CPC ................ *G03B 29/00* (2013.01); *F21V 9/00* (2013.01); *F21V 21/104* (2013.01); *F21V 29/80* (2015.01); *G03B 21/16* (2013.01)

(58) Field of Classification Search
CPC ...... G03B 29/00; G03B 21/145; G03B 21/14; F21V 33/0052; F21S 6/007
See application file for complete search history.

(56) References Cited

U.S. PATENT DOCUMENTS

| | | | |
|---|---|---|---|
| 2008/0036897 A1 | 2/2008 | Abe et al. | |
| 2009/0015799 A1* | 1/2009 | Luciano | ................. G03B 21/10 353/122 |

(Continued)

FOREIGN PATENT DOCUMENTS

| | | |
|---|---|---|
| CN | 102356420 A | 2/2012 |
| CN | 104662248 A | 5/2015 |

(Continued)

*Primary Examiner* — Ryan D Howard
(74) *Attorney, Agent, or Firm* — Dority & Manning, P.A.

(57) ABSTRACT

An illumination device with a projector includes a base, a shade having a side-surface shade surrounding an outer circumferential side of the base, an upper-surface shade disposed above the base, and a lower-surface shade disposed below the base, a projector which is installed on the base, and projects image light toward the side-surface shade, and an illumination unit for illuminating the upper-surface shade and the lower-surface shade from inside the shade. The side-surface shade is provided with a mirror surface part for reflecting light which shines on the side-surface shade from the outside. The mirror surface part is provided with an image light transmission part which the image light enters. The image light transmission part is a semi-transmissive mirror. Therefore, the image light can be projected via the semi-transmissive mirror, but a projection opening of the projector is not seen from the outside.

14 Claims, 9 Drawing Sheets

(56) References Cited

U.S. PATENT DOCUMENTS

| | | |
|---|---|---|
| 2012/0162996 A1 | 6/2012 | Ikeda |
| 2015/0219830 A1 | 8/2015 | Nohara et al. |
| 2017/0350566 A1 | 12/2017 | Ono et al. |
| 2019/0079374 A1 | 3/2019 | Watanabe et al. |

FOREIGN PATENT DOCUMENTS

| | | |
|---|---|---|
| CN | 108368997 A | 8/2018 |
| CN | 210951168 U | 7/2020 |
| CN | 210983011 U | 7/2020 |
| JP | 2008-42781 | 2/2008 |
| JP | 2009-156989 | 7/2009 |
| WO | WO2016/103512 | 6/2016 |

\* cited by examiner

ILLUMINATION DEVICE WITH PROJECTOR AND ILLUMINATION DEVICE

The present application is based on, and claims priority from JP Application Serial Number 2020-152012, filed Sep. 10, 2020, the disclosure of which is hereby incorporated by reference herein in its entirety.

BACKGROUND

1. Technical Field

The present disclosure relates to an illumination device with a projector, and an illumination device.

2. Related Art

When projecting an image with a projector, an appearance of the projector destroys the atmosphere of a space in some cases. It can prevent this to install the projector in a concealed manner, but in some cases, it is difficult to prepare such an installation location.

In International Patent Publication No. WO 2016/103512 (Document 1), there is disclosed an illumination device with an image projection function. The illumination device in Document 1 is of a pendant type, and a projector and a light source for illumination are disposed inside a chassis having a cylindrical shape or a conical shape. On a lower surface of the chassis, there is disposed a diffuser plate for diffusing illumination light. The diffuser plate is provided with an opening part or a transparent window part through which the image light projected from the projector is emitted.

In the illumination device in Document 1, since the projector is disposed inside the chassis, the projector is not exposed outside. However, when looking up the illumination device from below, the projection lens of the projector gets into eyes through the opening part or the window part. Therefore, there is a possibility of destroying the atmosphere of the space.

SUMMARY

In view of the problems described above, an illumination device with a projector according to the present disclosure includes a base, a shade having a side-surface shade surrounding an outer circumferential side of the base, an upper-surface shade disposed above the base, and a lower-surface shade disposed below the base, a projector which is installed on the base, and which is configured to project image light toward the side-surface shade, and an illumination unit configured to illuminate at least one of the upper-surface shade and the lower-surface shade from inside the shade, wherein the side-surface shade includes a mirror surface part configured to reflect light which shines on the side-surface shade from outside, the mirror surface part includes an image light transmission part through which the image light is transmitted, and the image light transmission part is a semi-transmissive mirror.

Further, an illumination device according to the present disclosure includes a base, a shade having a side-surface shade surrounding an outer circumferential side of the base, an upper-surface shade disposed above the base, and a lower-surface shade disposed below the base, and an illumination unit configured to illuminate at least one of the upper-surface shade and the lower-surface shade from inside the shade, wherein a projector installation space where a projector which is installed on the base and is configured to project image light toward the side-surface shade is to be disposed is disposed inside the side-surface shade, the side-surface shade includes a mirror surface part configured to reflect light which shines on the side-surface shade from outside, the mirror surface part includes an image light transmission part through which the image light is transmitted, and the image light transmission part is a semi-transmissive mirror.

DESCRIPTION OF EXEMPLARY EMBODIMENTS

Some embodiments of an illumination device with a projector to which the present disclosure is applied, and an illumination device to which the present disclosure is applied will hereinafter be described with reference to the drawings. A first embodiment through a fourth embodiment relates to the illumination device with the projector, and a fifth embodiment relates to the illumination device not including a projector.

First Embodiment

Figure 1:
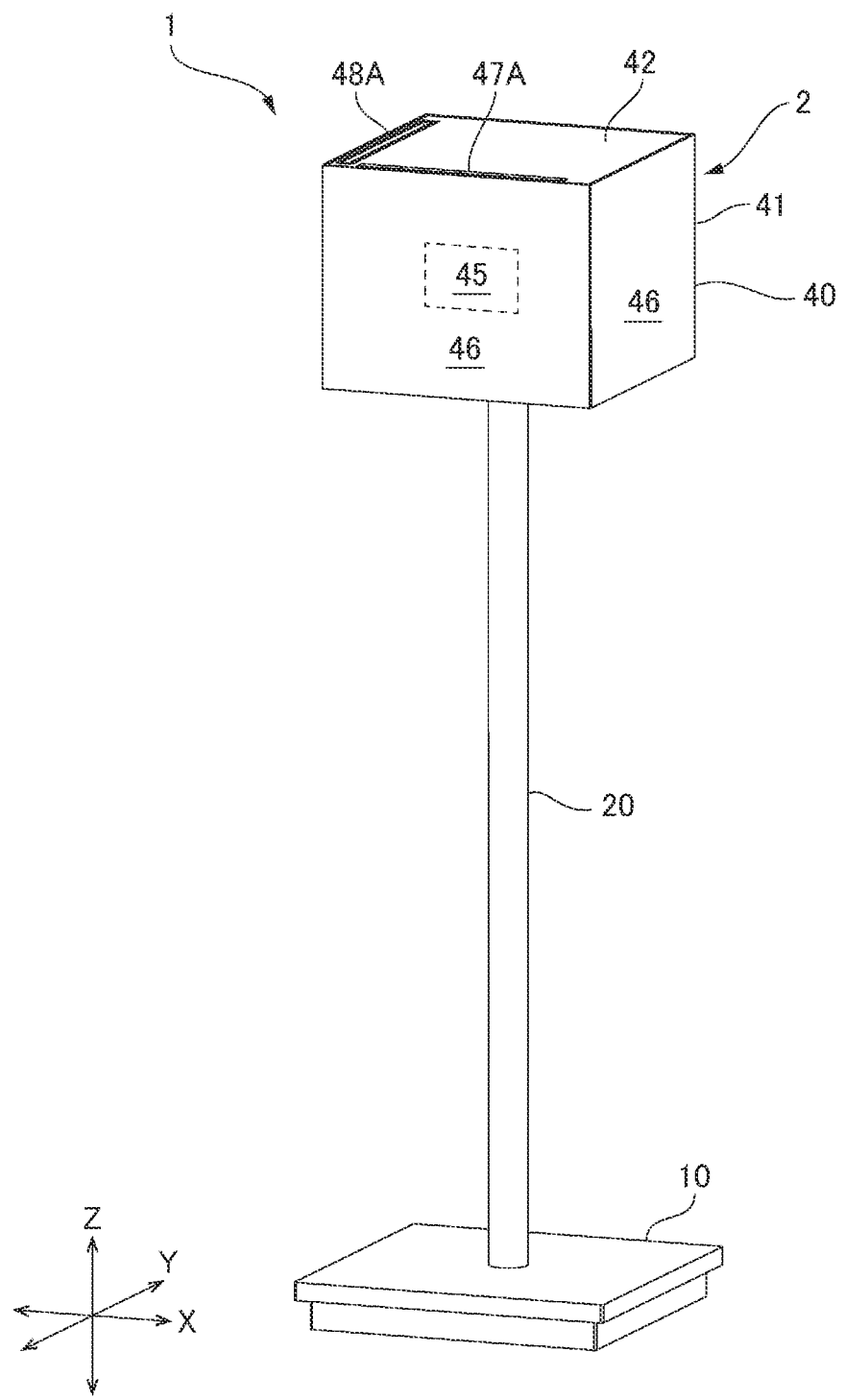
FIG. 1 is an external perspective view of an illumination device with a projector according to a first embodiment.
Figure 2:
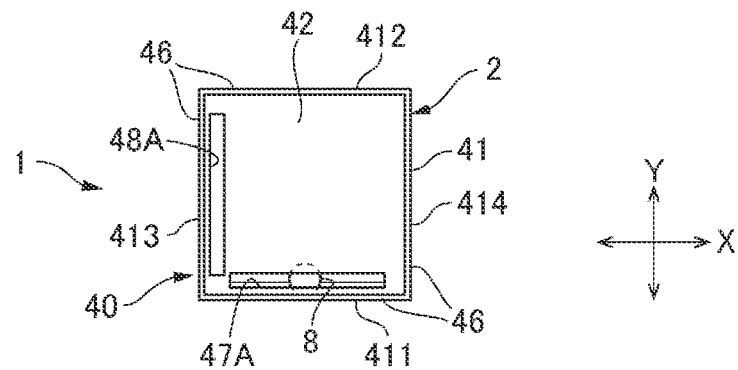
FIG. 2 shows a top view, a front view, and a bottom view of the illumination device with the projector shown in FIG. 1, wherein the front view shows an internal structure, and a pedestal part is omitted from the bottom view.
Figure 2:
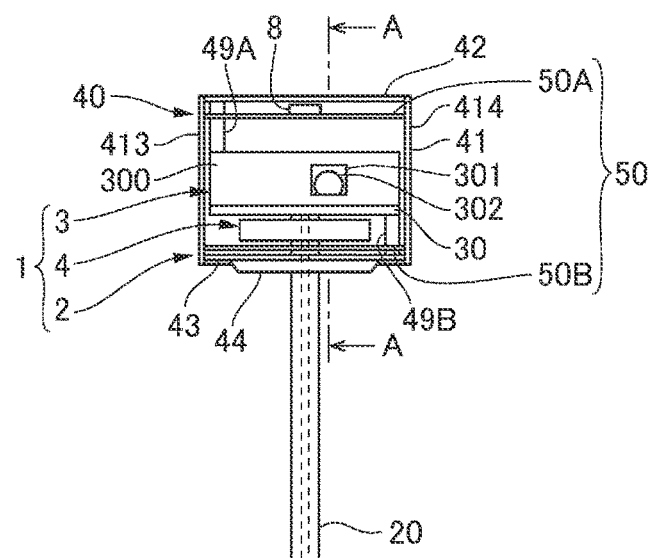
Figure 2:
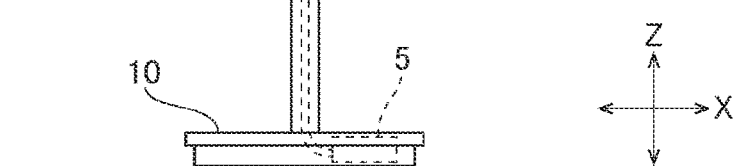
Figure 2:
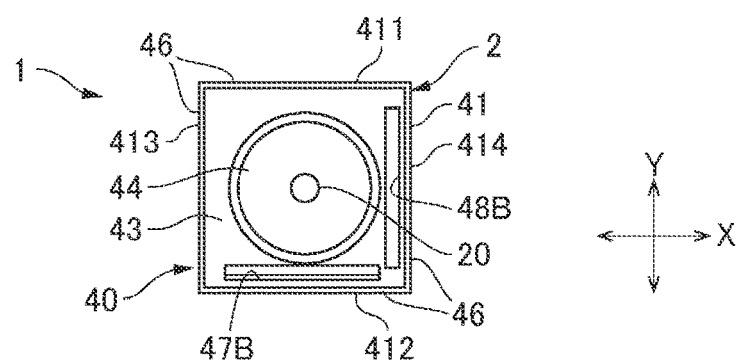
Figure 3:
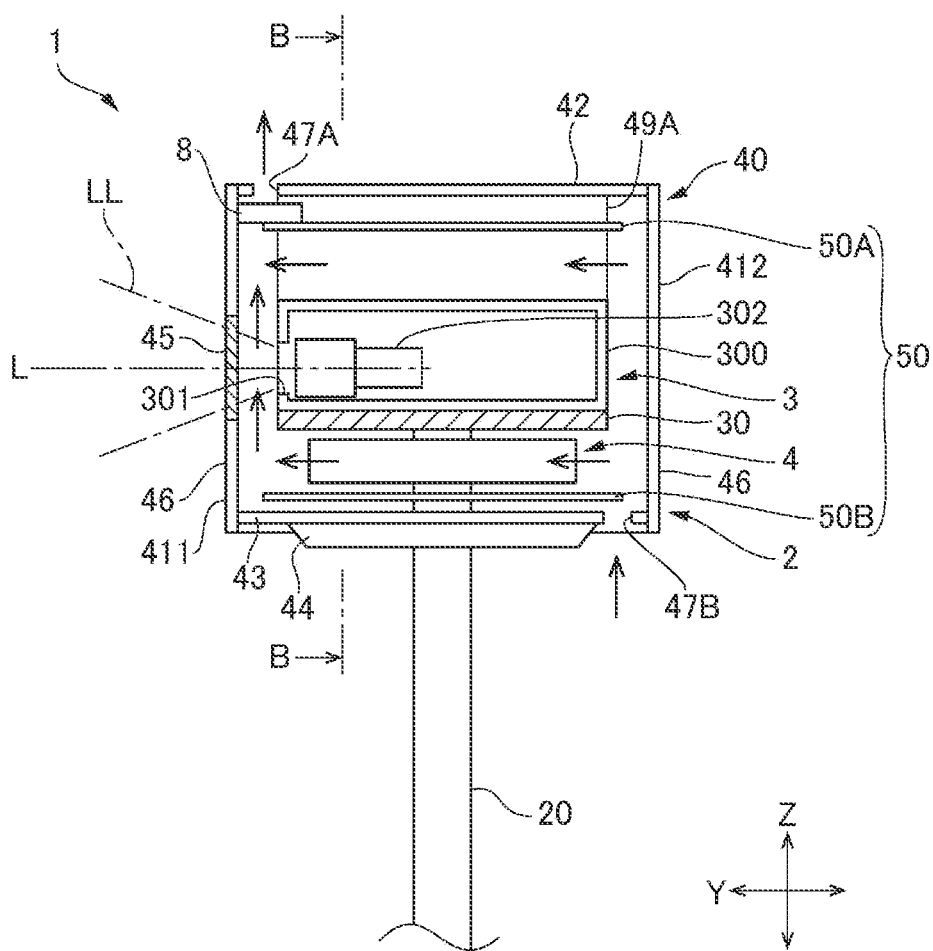
FIG. 3 is a cross-sectional view of the illumination device with the projector shown in FIG. 1 cut along a Y-Z plane.
Figure 4:
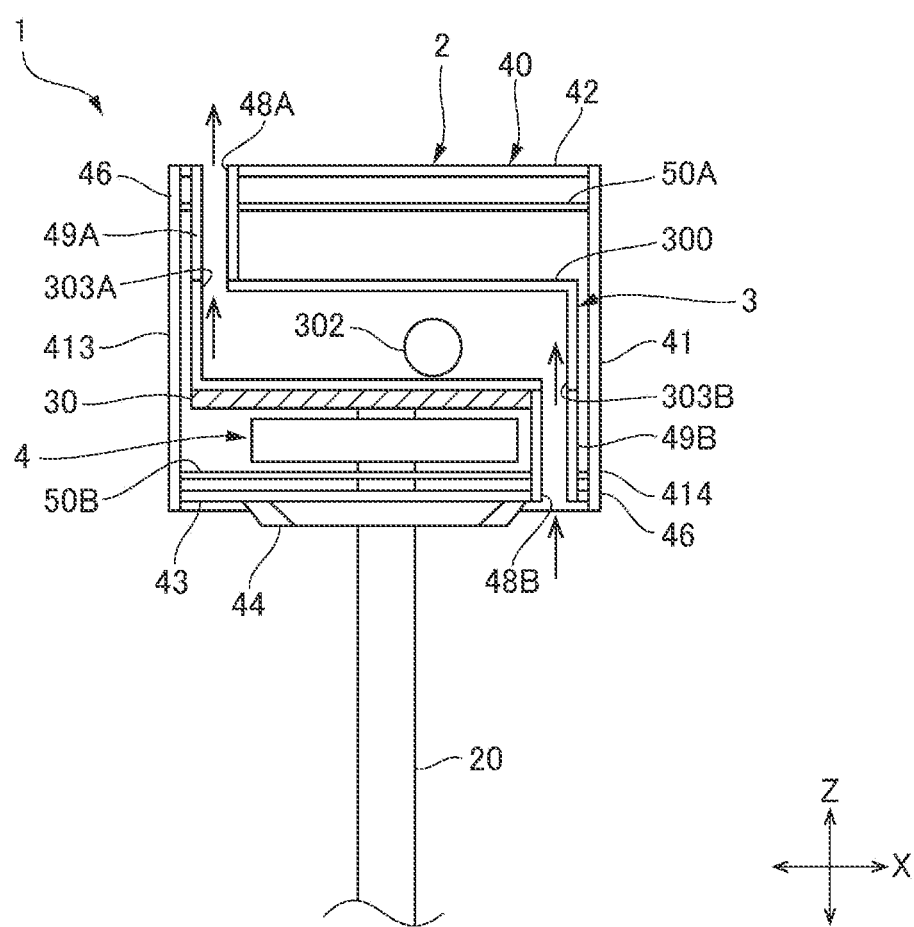
FIG. 4 is a cross-sectional view of the illumination device with the projector shown in FIG. 1 cut along an X-Z plane.

FIG. 1 is an external perspective view of the illumination device with the projector 1 according to the first embodiment. FIG. 2 shows a top view, a front view, and a bottom view of the illumination device with the projector 1 shown in FIG. 1, wherein the front view shows an internal structure, and a pedestal part 10 is omitted from the bottom view. FIG. 3 is a cross-sectional view of the illumination device with the projector 1 shown in FIG. 1 cut along a Y-Z plane, and is a diagram schematically showing a cross-sectional configuration when cutting the illumination device with the projector 1 at an A-A position in FIG. 2. FIG. 4 is a cross-sectional view of the illumination device with the projector 1 shown in FIG. 1 cut along an X-Z plane, and is a diagram schematically showing a cross-sectional configuration when cutting the illumination device with the projector 1 at a B-B position in FIG. 3. In the present specification, an X direction, a Y direction, and a Z direction are directions perpendicular to each other. The Z direction corresponds to a vertical direction, the Y direction corresponds to a front-back direction, and the X direction corresponds to a width direction.

Overall Structure

As shown in FIG. 1 and FIG. 2, the illumination device with the projector 1 is provided with an illumination device 2 shaped like a stand illumination, and a projector 3 and a speaker 4 installed inside the illumination device 2.

The illumination device 2 is provided with a pedestal part 10, a column 20 extending upward from the pedestal part 10, a base 30 disposed in a tip part of the column 20, a shade 40 surrounding the base 30, and an illumination unit 50 for illuminating the shade 40 from inside. Inside the pedestal part 10, there is installed a power supply device 5. The power supply device 5 is coupled to the projector 3, the speaker 4, and the illumination unit 50 via a cable 6 run inside the column 20.

As shown in FIG. 2, the projector 3 is disposed on the base 30, and is housed inside the shade 40. In the first embodiment, the projector 3 is installed on an upper surface of the base 30, and the speaker 4 is disposed below the base 30. The speaker 4 is supported by the column 20. The speaker 4 is coupled to the projector 3, and generates a sound based on an electrical signal supplied from the projector 3. For example, the speaker 4 is coupled to the projector 3 with near field communication.

It should be noted that it is possible to adopt a configuration of coupling the speaker 4 to the projector 3 with wired communication. Further, the arrangement of the speaker 4 is not limited to the arrangement shown in FIG. 2. For example, it is possible to adopt a configuration in which the speaker 4 is supported by the base 30. Alternatively, it is also possible to adopt a configuration in which the speaker 4 is disposed on an upper surface of the projector 3, and the speaker 4 is supported via the projector 3.

Projector

As shown in FIG. 2 and FIG. 3, the projector 3 is provided with an exterior case 300. In a front surface of the exterior case 300, there is opens a projection port 301 for emitting image light LL. The projector 3 is provided with a light source section not shown and housed in the exterior case 300, an image generation section, and a projection optical system 302 for projecting an image generated by the image generation section in an enlarged manner. The projection port 301 is disposed on an optical axis L of the projection optical system 302. Further, the projector 3 is provided with a fan and a control section which are not shown and are housed in the exterior case 300. The exterior case 300 is formed of flame-retardant resin or metal, and functions as a fireproof enclosure.

Shade

The shade 40 is provided with a side-surface shade 41 for surrounding an outer circumferential side of the base 30 and the projector 3, an upper-surface shade 42 disposed above the base 30, and a lower-surface shade 43 disposed below the base 30. As shown in FIG. 1 and FIG. 2, the shade 40 has a rectangular solid shape as a whole, and the side-surface shade 41 is a cylindrical member or a hollow surrounding member extending in the Z direction. The side-surface shade 41 is provided with a first side plate part 411 and a second side plate part 412 extending in parallel to the X direction, and a third side plate part 413 and a fourth side plate part 414 extending in parallel to the Y direction. The third side plate part 413 couples end parts at one side in the X direction of the first side plate part 411 and the second side plate part 412 to each other, and the fourth side plate part 414 couples end parts at the other side in the X direction of the first side plate part 411 and the second side plate part 412 to each other.

As shown in FIG. 3, the optical axis L of the projector 3 coincides with the Y direction, and the projection port 301 is opposed to the first side plate part 411. The first side plate part 411 is provided with an image light transmission part 45 opposed to the projection port 301. In the present embodiment, the image light transmission part 45 is formed of a semi-transmissive mirror. Therefore, the image light transmission part 45 reflects light from the outside, but the image light LL emitted from the projector 3 is transmitted through the image light transmission part 45, and is then projected to the outside of the shade 40. The speaker 4 emits a sound toward the first side plate part 411 on which the image light transmission part 45 is disposed. Therefore, the illumination device with the projector 1 emits the image light LL and the sound toward the same direction.

It should be noted that the arrangement of the speaker 4 is not limited to the configuration of disposing the speaker 4 so as to emit the sound toward the first side plate part 411. For example, it is possible to dispose the speaker 4 so as to emit the sound toward the third side plate part 413 or the fourth side plate part 414, or to dispose the speaker 4 so as to emit the sound toward the second side plate part 412.

The direction in which the sound is emitted can be all of the directions toward the first side plate part 411, the second side plate part 412, the third side plate part 413, and the fourth side plate part 414, or can also be a combination of any of them. Further, it is possible to dispose a speaker having a different performance such as a bass-oriented speaker.

The side-surface shade 41 is provided with a mirror surface part 46 for reflecting the light which shines on the side-surface shade 41 from the outside. In the present embodiment, the whole areas of outer surfaces of the first side plate part 411, the second side plate part 412, the third side plate part 413, and the fourth side plate part 414 correspond to the mirror surface part 46. As described above, the first side plate part 411 is provided with the image light transmission part 45, and the image light transmission part 45 is a semi-transmissive mirror. Therefore, a part of the mirror surface part 46 is a semi-transmissive mirror. As described above, in the present embodiment, since the whole of the outer surface of the side-surface shade 41 corresponds to the mirror surface part 46, and a part of the mirror surface part 46 is the image light transmission part 45 formed of the semi-transmissive mirror, boundaries between the image light transmission part 45 and other regions are difficult to sense from outside, and thus, the existence of the image light transmission part 45 is difficult to find. Further, the projector 3 cannot be seen from outside, and the projection port 301 cannot be seen.

The upper-surface shade 42 and the lower-surface shade 43 are each a diffuser plate for diffusely transmitting light. As shown in FIG. 2, in the present embodiment, the upper-surface shade 42 and the lower-surface shade 43 each have a rectangular shape, and outer circumferential edges of the upper-surface shade 42 and the lower-surface shade 43 are coupled to the side-surface shade 41. Therefore, an upper end of the side-surface shade 41 is closed by or covered with the upper-surface shade 42, and a lower end of the side-surface shade 41 is closed by or covered with the lower-surface shade 43.

The shade 40 is supported by the column 20. In the present embodiment, as shown in FIG. 2, a fixation part 44 having a disk-like shape is disposed at the center of the lower-surface shade 43. The shade 40 is supported by the column 20 via the fixation part 44. The fixation part 44 can be formed integrally with the lower-surface shade 43, or can also be a separate member from the lower-surface shade 43.

Illumination Unit

The illumination unit 50 is provided with a first illumination unit 50A and a second illumination unit 50B. The first illumination unit 50A illuminates an upper side, and the second illumination unit 50B illuminates a lower side. The first illumination unit 50A and the second illumination unit 50B are each a sheet light source. For example, the first illumination unit 50A and the second illumination unit 50B are each provided with an array of light emitting elements such as LED and wiring arranged on a substrate, and an arrangement area of the light emitting elements substantially uniformly emit light. The first illumination unit 50A and the second illumination unit 50B are fixed to the shade 40, and is supported by the column 20 via the shade 40.

In the present embodiment, the projector 3 is installed on the upper surface of the base 30, and the first illumination unit 50A is disposed above the projector 3. Further, the speaker 4 is installed below the base 30, and the second illumination unit 50B is disposed below the speaker 4. The first illumination unit 50A is opposed to the upper-surface shade 42 to illuminate the upper-surface shade 42 from below. Therefore, the light is diffusely radiated upward from the upper-surface shade 42. The second illumination unit 50B is opposed to the lower-surface shade 43 to illuminate the lower-surface shade 43 from above. Therefore, the light is diffusely radiated downward from the lower-surface shade 43.

Ventilation Holes

As shown in FIG. 2 and FIG. 3, the shade 40 is provided with an upper-side ventilation hole 47A penetrating the upper-surface shade 42, and a lower-side ventilation hole 47B penetrating the lower-surface shade 43. The upper-side ventilation hole 47A is an opening having a slit-like shape extending in the X direction along an edge at the first side plate part 411 side of the upper-surface shade 42. The lower-side ventilation hole 47B is an opening having a slit-like shape extending in the X direction along an edge at the second side plate part 412 side of the lower-surface shade 43.

As shown in FIG. 3, inside the upper-side ventilation hole 47A, there is disposed a fan 8 for exhaust. When driving the fan 8, the air flows inside the shade 40 from the lower-side ventilation hole 47B toward the upper-side ventilation hole 47A. The external air inflowing through the lower-side ventilation hole 47B flows behind the speaker 4 and the projector 3, then flows in the Y direction passing through a space between the base 30 and the second illumination unit 50B, and a space between the projector 3 and the first illumination unit 50A, and then rises along the first side plate part 411 to be discharged from the upper-side ventilation hole 47A.

In the present embodiment, the upper-side ventilation hole 47A and the lower-side ventilation hole 47B are disposed at diagonal positions when viewing the shade 40 from a lateral side (the X direction). Therefore, when suctioning the air from the lower-side ventilation hole 47B as an air intake ventilation hole and then exhausting the air from the upper-side ventilation hole 47A as an exhaust ventilation hole, the air flows along the first illumination unit 50A and the second illumination unit 50B as described above, and thus, the first illumination unit 50A and the second illumination unit 50B are cooled.

As shown in FIG. 2 and FIG. 4, the shade 40 is provided with an exhaust ventilation hole 48A penetrating the upper-surface shade 42, and an air intake ventilation hole 48B penetrating the lower-surface shade 43. The exhaust ventilation hole 48A is an opening having a slit-like shape extending in the Y direction along an edge at the third side plate part 413 side of the upper-surface shade 42. The air intake ventilation hole 48B is an opening having a slit-like shape extending in the Y direction along an edge at the fourth side plate part 414 side of the lower-surface shade 43.

As shown in FIG. 4, inside the upper-surface shade 42, there is disposed an exhaust duct 49A extending in a vertical direction. An upper end of the exhaust duct 49A is coupled to the exhaust ventilation hole 48A, and a lower end of the exhaust duct 49A is coupled to an exhaust port 303A provided to the exterior case 300 of the projector 3. Further, inside the lower-surface shade 43, there is disposed an air intake duct 49B extending in the vertical direction. A lower end of the air intake duct 49B is coupled to the exhaust ventilation hole 48B, and a lower end of the air intake duct 49B is coupled to an air intake port 303B provided to the exterior case 300 of the projector 3.

As described above, in the present embodiment, the exhaust port 303A of the projector 3 is coupled to the exhaust ventilation hole 48A of the shade 40, and the air intake port 303B is coupled to the air intake ventilation hole 48B of the shade 40. Therefore, when driving a fan (not shown) disposed inside the projector 3, the air is made to flow inside the exterior case 300 of the projector 3, and thus, the projection optical system 302, the image generation section, and the light source section are cooled.

Functions and Advantages of First Embodiment

As described hereinabove, the illumination device with the projector 1 according to the first embodiment has the base 30, the shade 40 provided with the side-surface shade 41 surrounding the outer circumferential side of the base 30, the upper-surface shade 42 disposed above the base 30, and the lower-surface shade 43 disposed below the base 30, the projector 3 installed on the base 30 and projecting the image light LL toward the side-surface shade 41, and the illumination unit 50 for illuminating the upper-surface shade 42 and the lower-surface shade 43 from inside the shade 40. The side-surface shade 41 is provided with the mirror surface part 46 for reflecting the light which shines on the side-surface shade 41 from the outside. The mirror surface part 46 is provided with the image light transmission part 45 through which the image light LL is transmitted. The image light transmission part 45 is the semi-transmissive mirror.

In the illumination device with the projector 1 according to the first embodiment, the side-surface shade 41 is provided with the mirror surface part 46, and a part of the mirror surface part 36 is the semi-transmissive mirror. Therefore, it is possible to project the image light LL from the projector 3 disposed inside the side-surface shade 41 to the outside of the shade 40 via the semi-transmissive mirror, but the existence of the projector 3 cannot been seen from the outside of the shade 40, and the projection opening 301 cannot been seen from the outside since the projection opening 301 is covered with the semi-transmissive mirror. Further, it is difficult to be found from the outside that a part of the side-surface shade 41 is a semi-transmissive mirror. Therefore, since the existence of the projector is not made to be felt when viewing the illumination device 2, the illumination device 2 is easy to fit in the space.

Further, in the first embodiment, since the illumination unit 50 illuminates the upper-surface shade 42 and the lower-surface shade 43 from inside, it is possible to irradiate the upper side and the lower side of the shade 40 with the light, and thus, the illumination device with the projector 1 can be used as an illumination. Therefore, when the illumination device with the projector 1 is not used as the projector, it is possible for the illumination device with the projector 1 to produce a better space as an illumination apparatus.

In the first embodiment, since the upper-surface shade 42 and the lower surface shade 43 are each a diffuser plate for diffusely transmitting the light, the inside of the shade 40 cannot be seen when viewed from the side of the upper-surface shade 42 and the lower-surface shade 43, and thus, the existence of the projector 3 is not made to be felt. Therefore, the illumination device with the projector 1 is easy to fit in the space.

Further, when using the illumination device with the projector 1 as the illumination apparatus, the upper surface and the lower surface of the shade 40 evenly emit the light. Therefore, it is possible to perform the space production of uniformly irradiating the ceiling and the floor surface.

In the first embodiment, the shade 40 is provided with the upper-side ventilation hole 47A penetrating the upper-surface shade 42, and the lower-side ventilation hole 47B penetrating the lower-surface shade 43. Therefore, since the air flows vertically inside the shade 40, it is possible to cool the illumination unit 50 disposed inside the shade 40. Therefore, it is possible to prevent the degradation of the light emitting element provided to the illumination unit 50, and it is possible to prevent the failure and shortening of the life of the illumination device 2.

The illumination device with the projector 1 according to the first embodiment is provided with the air intake duct 49B and the exhaust duct 49A disposed inside the shade 40. The shade 40 is provided with the air intake ventilation hole 48B and the exhaust ventilation hole 48A, and the air intake duct 49B couple the air intake port 303B of the projector 3 and the air intake ventilation hole 48B to each other, and the exhaust duct 49A couples the exhaust port 303A of the projector 3 and the exhaust ventilation hole 48A to each other. As described above, since the space where the illumination unit 50 is disposed and the internal space of the projector 3 are partitioned, cooling of the inside of the projector 3 and cooling of the illumination unit 50 can separately be performed from each other. Thus, since it is possible to efficiently exhaust the internal heat of the projector 3 to the outside of the shade 40, it is possible to avoid an excessive rise in the internal temperature of the projector 3. Therefore, it is possible to prevent the failure and the shortening of the life of the projector 3.

In the first embodiment, the lower-side ventilation hole 47B functions as the air intake ventilation hole, and the upper-side ventilation hole 47A functions as the exhaust ventilation hole. In other words, the lower-side ventilation hole 47B is a first air intake ventilation hole communicated with a space between the shade 40 and the projector 3, and the upper-side ventilation hole 47A is a first exhaust ventilation hole communicated with a space between the shade 40 and the projector 3. Further, the air intake ventilation hole 48B is a second air intake ventilation hole coupled to the air intake port 303B of the projector 3 via the air intake duct 49B, and the exhaust ventilation hole 48A is a second exhaust ventilation hole coupled to the exhaust port 303A of the projector 3 via the exhaust duct 49A. As described above, in the present embodiment, since the plurality of air intake ventilation holes and the plurality of exhaust ventilation holes are provided, it is possible to efficiently exhaust the heat of each sections partitioning the space where the illumination unit 50 is disposed and the internal space of the projector 3.

The illumination device with the projector 1 according to the first embodiment is provided with the speaker 4 disposed inside the shade 40, and the speaker 4 emits the sound toward the side where the image light transmission part 45 is disposed. Therefore, since it is possible to emit the picture and the sound in the same direction, it is possible to perform the production not only with the picture but also with the sound. Further, since speaker 4 cannot be seen from the outside of the shade 40 similarly to the projector 3, the existence of the speaker 4 is not felt when viewing the illumination device 2. Therefore, the illumination device with the projector 1 is easy to fit in the space.

The illumination device with the projector 1 according to the first embodiment is provided with the pedestal part 10 and the column 20 extending upward from the pedestal part 10. The power supply device 5 is provided to the pedestal part 10, and the cable 6 for coupling the projector 3 and the illumination unit 50 to the power supply device 5 is run inside the column 20. Therefore, since the existence of the power supply device 5 and the cable 6 coupled to the projector 3 is not felt, the illumination device with the projector 1 is easy to fit in the space.

Modified Examples of First Embodiment (1) In the first embodiment, although the two units, namely the first illumination unit 50A and the second illumination unit 50B, are provided as the illumination unit 50, it is possible to adopt a configuration provided only either one thereof. For example, it is possible to adopt a configuration provided only the first illumination unit 50A. In this case, it is sufficient for the upper-surface shade 42 and the lower-surface shade 43 to have a diffuser plate in an illumination target portion to be illuminated by the illumination unit 50, and other portions can be formed of a material different from that of the diffuser plate. For example, when being provided only with the first illumination unit 50A, it is sufficient for the upper-surface shade 42 to be formed of the diffuser plate, and the lower-surface shade 43 is not required to transmit light.

(2) Although in the first embodiment, the whole of the outer surface of the side-surface shade 41 corresponds to the mirror surface part 46, it is possible to adopt a configuration in which only a part of the side-surface shade 41 corresponds to the mirror surface part 46. For example, it is possible to adopt a configuration in which the first side plate part 411 is formed of the mirror surface part 46, and the second side plate part 412, the third side plate part 413, and the fourth side plate part 414 are not formed of the mirror surface part 46. Alternatively, it is also possible to adopt a configuration in which a central portion in the Z direction of each of the first side plate part 411, the second side plate part 412, the third side plate part 413, and the fourth side plate part 414 is formed of the mirror surface part 46, and other portions are not formed of the mirror surface part 46.

Second Embodiment

Figure 5:
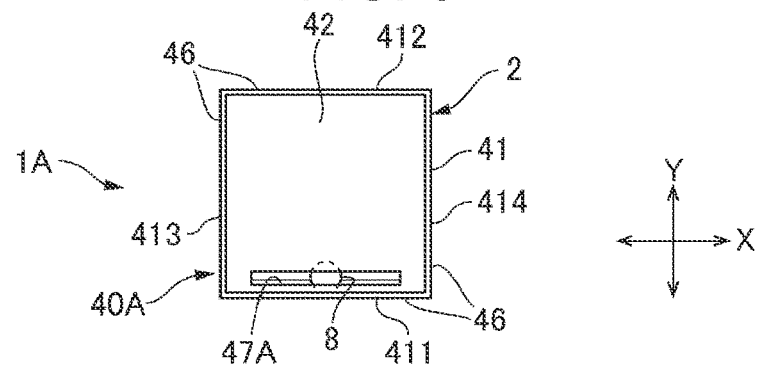
FIG. 5 shows a top view, a front view, and a bottom view of an illumination device with a projector according to a second embodiment, wherein the front view shows an internal structure, and a pedestal part is omitted from the bottom view.
Figure 5:
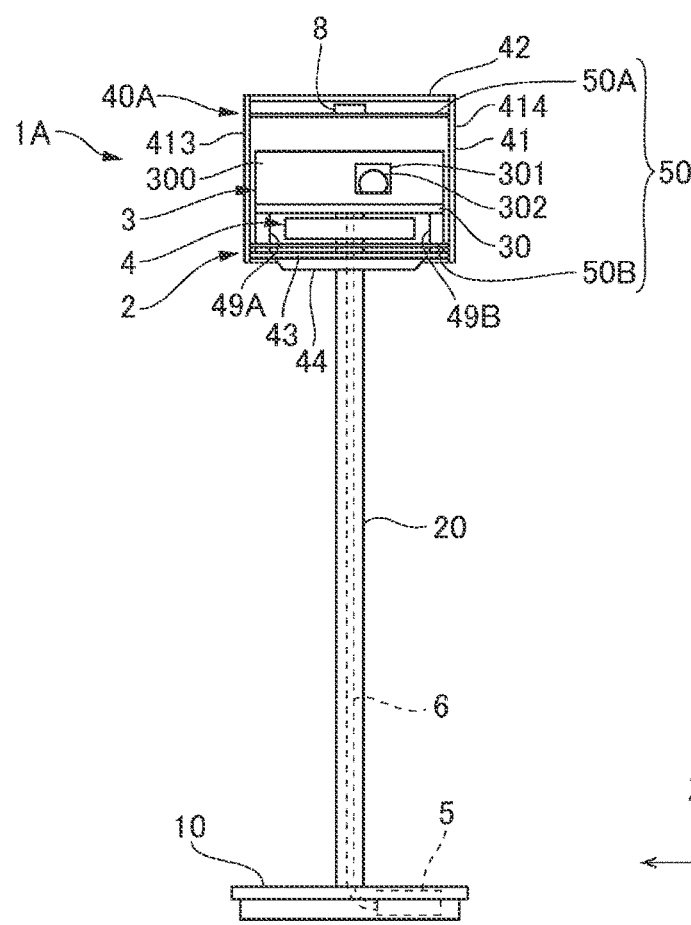
Figure 5:
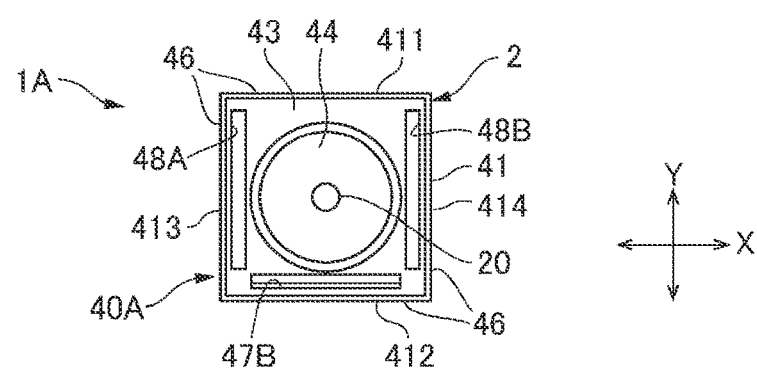

FIG. 5 shows a top view, a front view, and a bottom view of an illumination device with a projector 1A according to a second embodiment, wherein the front view shows an internal structure, and the pedestal part 10 is omitted from the bottom view. The illumination device with the projector 1A according to the second embodiment is the same in configuration as that in the first embodiment except the point that the arrangement of the exhaust ventilation hole 48A and the air intake ventilation hole 48B, and the arrangement of the exhaust duct 49A and the air intake duct 49B are different from those in the first embodiment. Therefore, the corresponding constituents are denoted by the same reference symbols, and the description thereof will be omitted.

As shown in FIG. 5, a shade 40A of the illumination device with the projector 1A is provided with the exhaust ventilation hole 48A and the air intake ventilation hole 48B each penetrating the lower-surface shade 43. In the second embodiment, the exhaust port 303A and the air intake port 303B are provided to the bottom surface of the exterior case 300 of the projector 3. The exhaust ventilation hole 48A is disposed below the exhaust port 303A, and the exhaust duct 49A couples the exhaust ventilation hole 48A and the exhaust port 303A to each other. The air intake ventilation hole 48B is disposed below the air intake port 303B, and the air intake duct 49B couples the air intake ventilation hole 48B and the air intake port 303B to each other.

Similarly to the first embodiment, in the second embodiment, the space where the illumination unit 50 is disposed and the inside of the projector 3 are partitioned. Therefore, when driving a fan (not shown) disposed inside the projector 3, it is possible to efficiently cool the inside of the projector 3. Therefore, substantially the same functions and advantages as in the first embodiment can be obtained.

Third Embodiment

Figure 6:
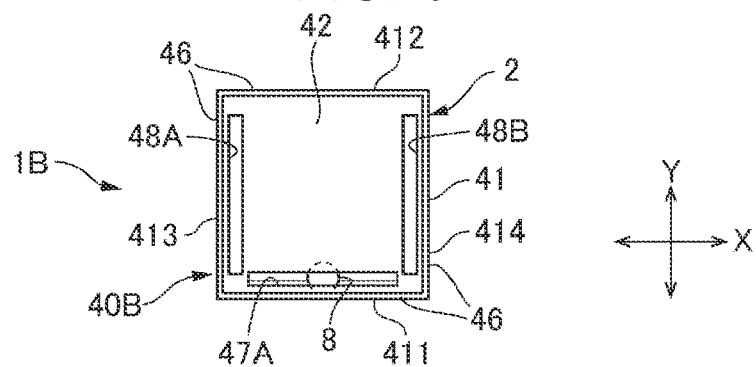
FIG. 6 shows a top view, a front view, and a bottom view of an illumination device with a projector according to a third embodiment, wherein the front view shows an internal structure, and a pedestal part is omitted from the bottom view.
Figure 6:
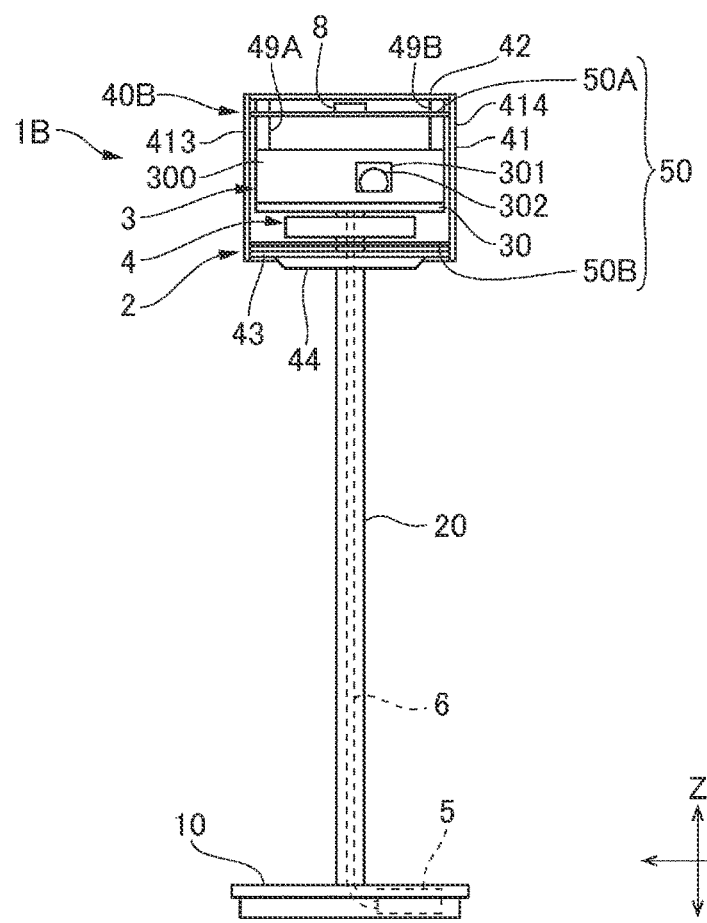
Figure 6:
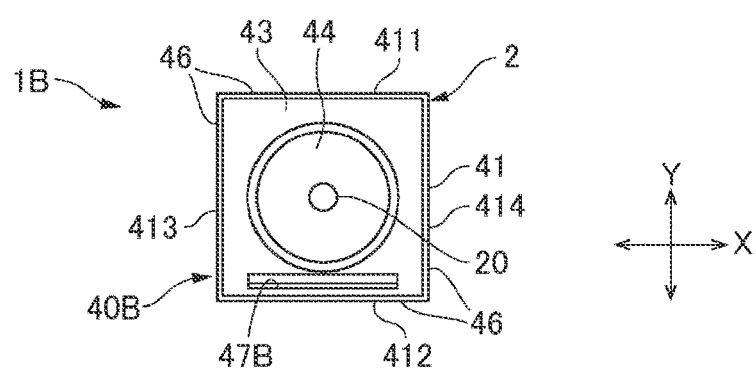

FIG. 6 shows a top view, a front view, and a bottom view of an illumination device with a projector 1B according to a third embodiment, wherein the front view shows an internal structure, and the pedestal part 10 is omitted from the bottom view. The illumination device with the projector 1B according to the third embodiment is the same in configuration as that in the first embodiment and the second embodiment except the point that the arrangement of the exhaust ventilation hole 48A and the air intake ventilation hole 48B, and the arrangement of the exhaust duct 49A and the air intake duct 49B are each flipped in the vertical direction from those in the second embodiment. Therefore, the corresponding constituents are denoted by the same reference symbols, and the description thereof will be omitted.

As shown in FIG. 6, a shade 40B of the illumination device with the projector 1B is provided with the exhaust ventilation hole 48A and the air intake ventilation hole 48B each penetrating the upper-surface shade 42. In the third embodiment, the exhaust port 303A and the air intake port 303B are provided to the upper surface of the exterior case 300 of the projector 3. The exhaust ventilation hole 48A is disposed above the exhaust port 303A, and the exhaust duct 49A couples the exhaust ventilation hole 48A and the exhaust port 303A to each other. The air intake ventilation hole 48B is disposed above the air intake port 303B, and the air intake duct 49B couples the air intake ventilation hole 48B and the air intake port 303B to each other.

Similarly to the first embodiment and the second embodiment, in the third embodiment, the space where the illumination unit 50 is disposed and the inside of the projector 3 are partitioned. Therefore, when driving a fan (not shown) disposed inside the projector 3, it is possible to efficiently cool the inside of the projector 3. Therefore, substantially the same functions and advantages as in the first embodiment and the second embodiment can be obtained.

Fourth Embodiment

Figure 7:
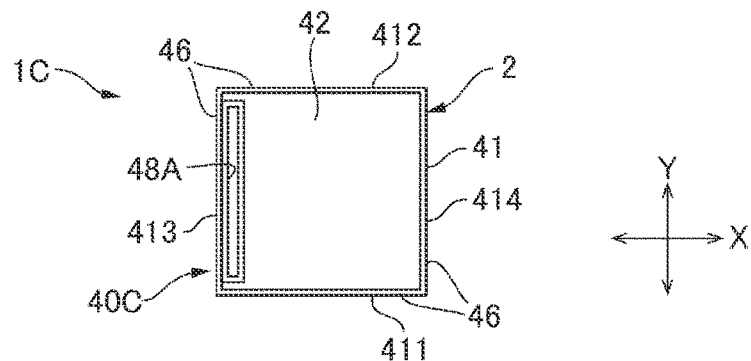
FIG. 7 shows a top view, a front view, and a bottom view of an illumination device with a projector according to a fourth embodiment, wherein the front view shows an internal structure, and a pedestal part is omitted from the bottom view.
Figure 7:
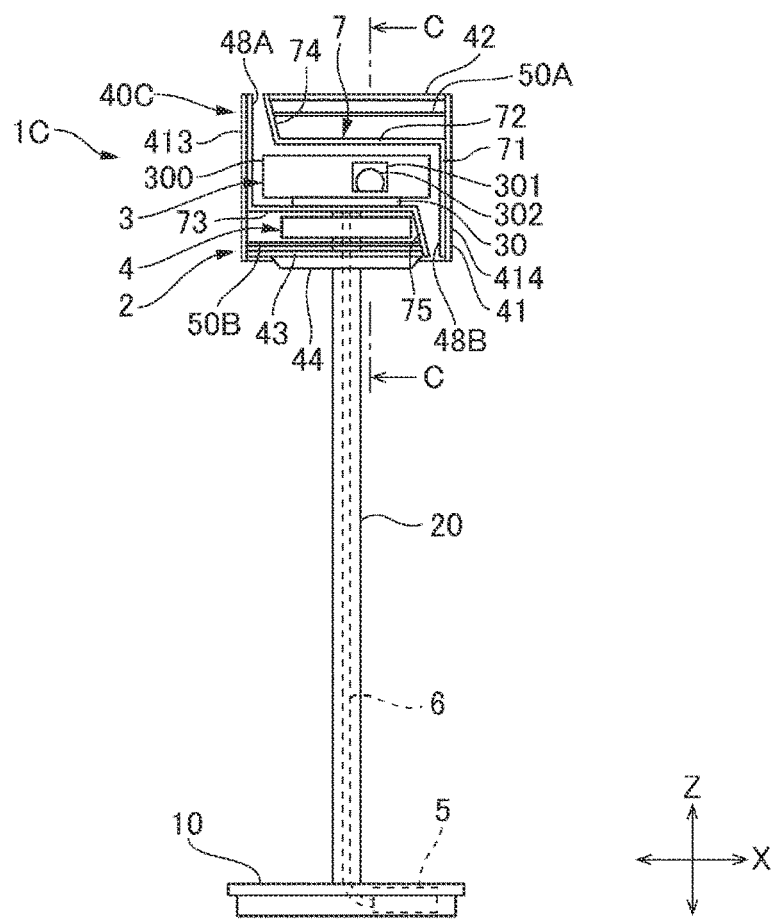
Figure 7:
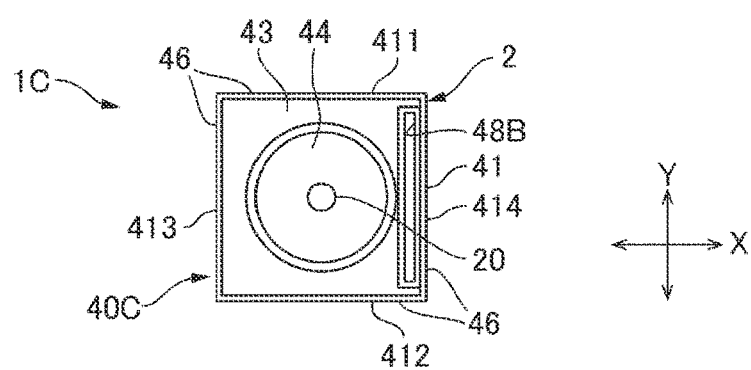

FIG. 7 shows a top view, a front view, and a bottom view of an illumination device with a projector 1C according to a fourth embodiment, wherein the front view shows an internal structure, and the pedestal part 10 is omitted from the bottom view. As shown in FIG. 7, the illumination device with the projector 1C according to the fourth embodiment is provided with an inner case 7 fixed to an inner surface of a shade 40C. The inner case 7 is formed of flame-retardant resin, and functions as a fireproof enclosure. In the fourth embodiment, the base 30 and the projector 3 are installed inside the inner case 7. The speaker 4 is disposed outside the inner case 7.

The inner case 7 is provided with a side-surface case 71 for surrounding an outer circumferential side of the base 30 and the projector 3, an upper-surface case 72, and a lower-surface case 73. The upper-surface case 72 is coupled to an upper end of the side-surface case 71, and the lower-surface case 73 is coupled to a lower end of the side-surface case 71. Further, the inner case 7 is provided with an exhaust duct part 74 which is coupled to a gap between the side-surface case 71 and the upper-surface case 72, and extends upward, and an air intake duct part 75 which is coupled to a gap between the side-surface case 71 and the lower-surface case 73, and extends downward. The side-surface case 71 is fixed to an inner surface of the side-surface shade 41, and functions as a fireproof layer. In other words, the shade 40C in the fourth embodiment is provided with the fireproof layer disposed on the inner surface of the side-surface shade 41.

Figure 8:
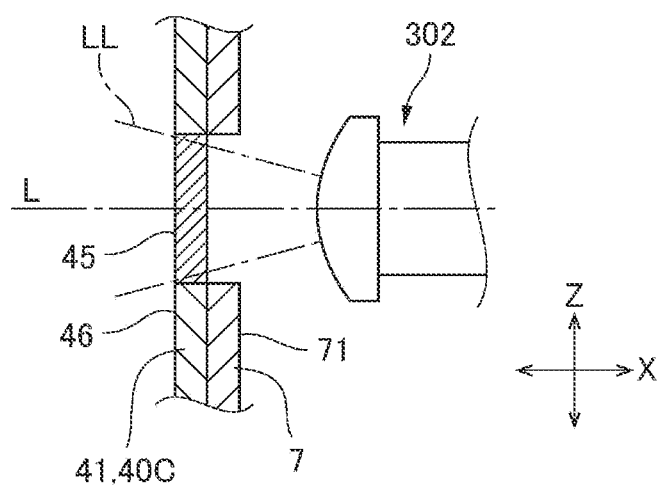
FIG. 8 is a partial cross-sectional view of the illumination device with the projector shown in FIG. 7.

FIG. 8 is a partial cross-sectional view of the illumination device with the projector 1C shown in FIG. 7, and is a partial cross-sectional view of the first side plate part 411 cut at the C-C position in FIG. 7. As shown in FIG. 8, the side-surface case 71 is disposed in an area which does not include the inner surface of the image light transmission part 45 out of the inner surface of the side-surface shade 41. In other words, the side-surface case 71 is disposed in the area which does not include the semi-transmissive mirror out of the inner surface of the side-surface shade 41. Therefore, there is no chance for the image light LL to be blocked by the side-surface case 71, but the image light LL emitted from the projector 3 is transmitted through the image light transmission part 45, and is then projected to the outside of the shade 40C. Therefore, similarly to each of the embodiments described above, it is possible to project the image light LL to the space.

The shade 40C in the fourth embodiment is provided with the exhaust ventilation hole 48A penetrating the upper-surface shade 42, and the air intake ventilation hole 48B penetrating the lower-surface shade 43. The exhaust duct part 74 of the inner case 7 is coupled to the exhaust ventilation hole 48A. The air intake duct part 75 of the inner case 7 is coupled to the air intake ventilation hole 48B. Therefore, since the inside of the inner case 7 is partitioned from the space where the illumination unit 50 is disposed, it is possible to efficiently cool the projector 3 disposed inside the inner case 7.

In the fourth embodiment, since the shade 40C is provided with the inner case 7 which functions as the fireproof enclosure, the exterior case 300 of the projector 3 is not required to be provided with the function as the fireproof enclosure. Alternatively, the projector 3 is not required to be provided with the external case 300, and is sufficiently provided with a function of projecting the image light LL. For example, in the fourth embodiment, it is possible to adopt a configuration in which the light source section, the image generation section, and the projection optical system 302 are directly installed on the base 30.

In the fourth embodiment, the upper-surface case 72 is disposed below the first illumination unit 50A, and therefore, has no chance of blocking the light from the first illumination unit 50A. Further, the lower-surface case 73 is disposed above the second illumination unit 50B, and therefore, has no chance of blocking the light from the second illumination unit 50B. Therefore, the illumination device with the projector 1C according to the fourth embodiment can be used as the illumination similarly to each of the embodiments described above, and is capable of producing a better space as the illumination equipment even when not being used as the projector.

The shade 40C in the fourth embodiment is not provided with the upper-side ventilation hole 47A and the lower-side ventilation hole 47B, and is not provided with the fan 8 for exhaust, but can also adopt the configuration provided with the upper-side ventilation hole 47A, the lower-side ventilation hole 47B, and the fan 8 similarly to each of the embodiments described above. Thus, similarly to each of the embodiments described above, it is possible to cool the first illumination unit 50A and the second illumination unit 50B.

Fifth Embodiment

Figure 9:
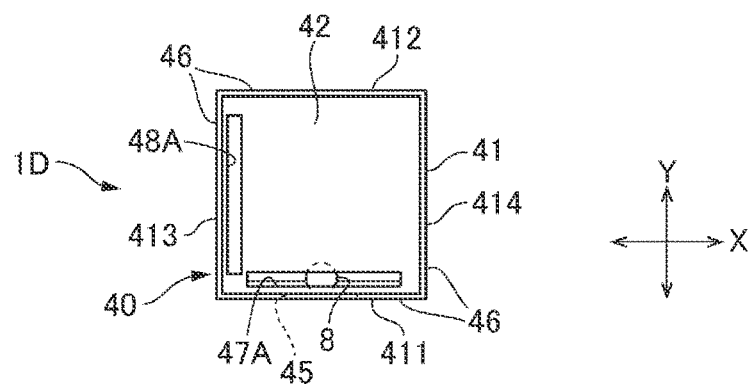
FIG. 9 shows a top view, a front view, and a bottom view of an illumination device according to a fifth embodiment, wherein the front view shows an internal structure, and a pedestal part is omitted from the bottom view.
Figure 9:
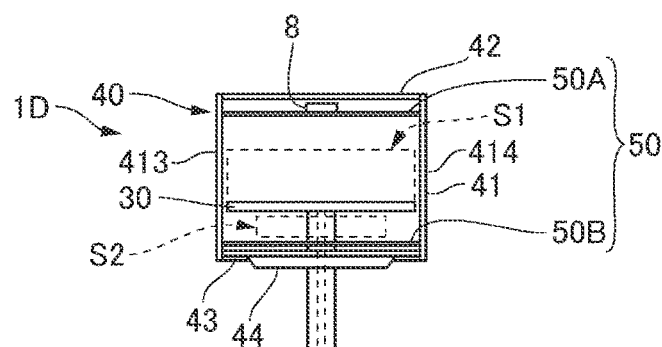
Figure 9:
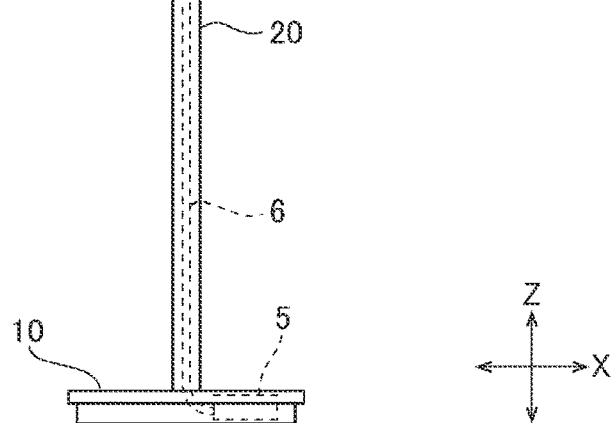
Figure 9:
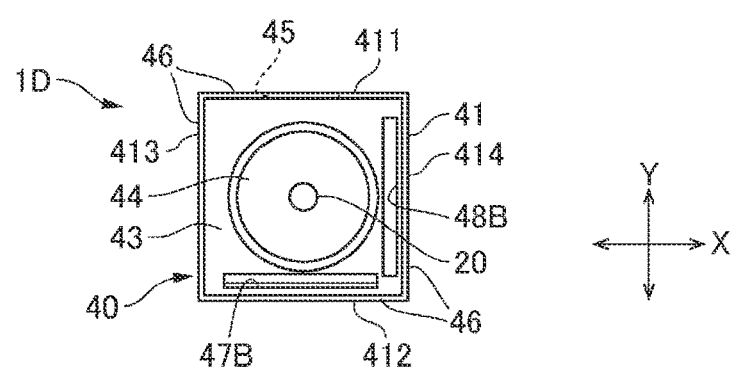

FIG. 9 shows a top view, a front view, and a bottom view of an illumination device 1D according to a fifth embodiment, wherein the front view shows an internal structure, and a pedestal part 10 is omitted from the bottom view. The illumination device 1D according to the fifth embodiment has the same configuration as that of the illumination device 2 in the illumination device with the projector 1 according to the first embodiment. Therefore, the corresponding constituents are denoted by the same reference symbols, and the description thereof will be omitted.

The illumination device 1D has the base 30, the shade 40 provided with the side-surface shade 41 surrounding the outer circumferential side of the base 30, the upper-surface shade 42 disposed above the base 30, and the lower-surface shade 43 disposed below the base 30, and the illumination unit 50 for illuminating the upper-surface shade 42 and the lower-surface shade 43 from inside the shade 40. Inside the side-surface shade 41, there is disposed a projector installation space S1 in which the projector 3 for projecting the image light LL toward the side-surface shade 41 is installed. The side-surface shade 41 is provided with the mirror surface part 46 for reflecting the light which shines on the side-surface shade 41 from the outside. The mirror surface part 46 is provided with the image light transmission part 45 which the image light LL enters, and the image light transmission part 45 is a semi-transmissive mirror.

In the illumination device 1D according to the fifth embodiment, the projector 3 and the speaker 4 are not installed inside the shade 40, but the projector installation space S1 is disposed inside the shade 40. Further, inside the shade 40, there is disposed a speaker installation space S2 located below the base 30. Therefore, by installing the projector 3 and the speaker 4 inside the illumination device 1D, the illumination device 1D can be used similarly to the first embodiment, and can obtain substantially the same functions and advantages as in the first embodiment.

Other Embodiments

Each of the embodiments described above relates to the stand illumination device, but the present disclosure can be applied to a ceiling-mount illumination device. For example, it is possible to adopt a configuration in which the pedestal part 10 and the column 20 are not provided, but a fixation part for fixing a suspender is disposed at the center of the upper-surface shade 42. Alternatively, it is also possible to adopt a configuration of directly installing the illumination device on the ceiling or a wall surface.

In each of the embodiments described above, the planar shape of the shade is a rectangular shape, but can also be a circular shape or an elliptical shape. Further, the planar shape can also be a polygonal shape other than the rectangular shape. For example, a triangular shape or a hexagonal shape can be adopted. Further, the shade can be provided with a conical shape or a pyramidal shape.

In each of the embodiments described above, the ventilation holes for cooling the illumination unit 50 and the exhaust ventilation hole and the air intake ventilation hole for cooling the inside of the projector 3 can each be a through hole disposed at the upper-surface shade side or the lower-surface shade side of the side-surface shade 41 instead of the opening provided to the upper-surface shade 42 or the lower-surface shade 43. Alternatively, it is possible to adopt an opening formed of a cutout provided to an end of the side-surface shade 41 and the upper-surface shade 42 or the lower-surface shade 43. In this case, it is advisable to adopt an opening increased in design such as an opening formed of a plurality of openings to thereby make the existence thereof inconspicuous, or an undulate opening.

Each of the air intake ventilation hole and the exhaust ventilation hole can be disposed in any region of an upper part and a lower part of the shade, or can also be disposed in both of the upper part and the lower part of the shade. Here, the upper part of the shade includes not only the upper-surface shade 42 but also a region at the upper-surface shade side of the side-surface shade 41 as described above. Further, the lower part of the shade includes not only the lower-surface shade 43 but also a region at the lower-surface shade side of the side-surface shade 41 as described above.

What is claimed is:

1. An illumination device with a projector comprising:
a base;
a shade having a side-surface shade surrounding an outer circumferential side of the base, an upper-surface shade disposed above the base, and a lower-surface shade disposed below the base;
a projector which is installed on the base, and which is configured to project image light toward the side-surface shade; and
an illumination unit configured to illuminate at least one of the upper-surface shade and the lower-surface shade from inside the shade, wherein
the side-surface shade includes a mirror surface part configured to reflect light which shines on the side-surface shade from outside,
the mirror surface part includes an image light transmission part through which the image light is transmitted, and
the image light transmission part is a semi-transmissive mirror.

2. The illumination device with the projector according to claim 1, wherein
the side-surface shade is constituted by a plurality of planes, and
a plane provided with the image light transmission part out of the plurality of planes is provided with the mirror surface part.

3. The illumination device with the projector according to claim 1, wherein
the shade is provided with an air intake ventilation hole and an exhaust ventilation hole.

4. The illumination device with the projector according to claim 3, wherein
one of the air intake ventilation hole and the exhaust ventilation hole is disposed in at least one of an upper part and a lower part of the shade, and
another of the air intake ventilation hole and the exhaust ventilation hole is disposed in either of the upper part and the lower part of the shade.

5. The illumination device with the projector according to claim 3, wherein
the air intake ventilation hole and the exhaust ventilation hole are disposed in at least one of as upper part and a lower part of the shade.

6. The illumination device with the projector according to claim 3, wherein
the air intake ventilation hole is provided with a first air intake ventilation hole communicated with a space between the shade and the projector,
the exhaust ventilation hole is provided with a first exhaust ventilation hole communicated with a space between the shade and the projector, and
air is taken through the first air intake ventilation hole, cools inside the space between the shade and the projector, and is then exhausted through the first exhaust ventilation hole.

7. The illumination device with the projector according to claim 3, further comprising:
an air intake duct and an exhaust duct disposed inside the shade, wherein
the air intake duct couples an air intake port of the projector and the air intake ventilation hole to each other, and
the exhaust duct couples an exhaust port of the projector and the exhaust ventilation hole to each other.

8. The illumination device with the projector according to claim 6, further comprising:
an air intake duct and an exhaust duct disposed inside the shade, wherein
the air intake ventilation hole is provided with a second air intake ventilation hole to be coupled to the air intake duct,
the exhaust ventilation hole is provided with a second exhaust ventilation hole to be coupled to the exhaust duct,
the air intake duct couples an air intake port of the projector and the second air intake ventilation hole to each other, and
the exhaust duct couples an exhaust port of the projector and the second exhaust ventilation hole to each other.

9. The illumination device with the projector according to claim 1, wherein
an illumination target portion which is a portion of the upper-surface shade and the lower-surface shade, and is illuminated by the illumination unit is a diffuser plate configured to diffusely transmit light.

10. The illumination device with the projector according to claim 1, further comprising:
a speaker installed inside the shade.

11. The illumination device with the projector according to claim 10, wherein
the speaker emits a sound toward a side at which the semi-transmissive mirror is disposed.

12. The illumination device with the projector according to claim 1, further comprising:
a fireproof layer disposed inside the side-surface shade, wherein
the fireproof layer is disposed in an area which does not include an inner surface of the semi-transmissive mirror.

13. The illumination device with the projector according to claim 1, further comprising:
a pedestal part; and
a column extending upward from the pedestal part, wherein
a power supply device is provided to the pedestal part, and
a cable configured to couple the projector and the illumination unit to the power supply device runs inside the column.

14. An illumination device comprising:
a base;
a shade having a side-surface shade surrounding an outer circumferential side of the base, an upper-surface shade disposed above the base, and a lower-surface shade disposed below the base; and
an illumination unit configured to illuminate at least one of the upper-surface shade and the lower-surface shade from inside the shade, wherein
a projector installation space where a projector which is installed on the base and is configured to project image light toward the side-surface shade is to be disposed is disposed inside the side-surface shade,
the side-surface shade includes a mirror surface part configured to reflect light which shines on the side-surface shade from outside,
the mirror surface part includes an image light transmission part through which the image light is transmitted, and
the image light transmission part is a semi-transmissive mirror.

* * * * *